US012099522B2

(12) United States Patent
Yang et al.

(10) Patent No.: US 12,099,522 B2
(45) Date of Patent: Sep. 24, 2024

(54) METHOD AND SYSTEM FOR REDUCING STORAGE OVERHEAD OF BLOCKCHAIN NODES, AND STORAGE MEDIUM

(71) Applicant: Shanghai Tree-Graph Blockchain Institute, Shanghai (CN)

(72) Inventors: Guang Yang, Shanghai (CN); Chenxing Li, Shanghai (CN); Fengyu Zhang, Shanghai (CN); Ming Wu, Shanghai (CN); Fan Long, Shanghai (CN); Peilun Li, Shanghai (CN)

(73) Assignee: Shanghai Tree-Graph Blockchain Institute, Shanghai (CN)

( * ) Notice: Subject to any disclaimer, the term of this patent is extended or adjusted under 35 U.S.C. 154(b) by 8 days.

(21) Appl. No.: 18/151,233

(22) Filed: Jan. 6, 2023

(65) Prior Publication Data
US 2023/0141175 A1    May 11, 2023

(51) Int. Cl.
G06F 16/27        (2019.01)
G06F 16/28        (2019.01)
H04L 67/1042      (2022.01)
H04L 67/1074      (2022.01)

(52) U.S. Cl.
CPC ............ *G06F 16/27* (2019.01); *G06F 16/282* (2019.01); *H04L 67/1042* (2013.01); *H04L 67/1074* (2013.01)

(58) Field of Classification Search
CPC ... G06F 16/27; G06F 16/282; H04L 67/1042; H04L 67/1074

USPC ......................................................... 707/610
See application file for complete search history.

(56) References Cited

U.S. PATENT DOCUMENTS

| | | | |
|---|---|---|---|
| 10,769,135 B1* | 9/2020 | Zhuo ................... | G06F 16/2379 |
| 10,803,012 B1* | 10/2020 | Madhavarapu ....... | G06F 16/113 |
| 2020/0344069 A1* | 10/2020 | Zhuo ..................... | H04L 9/3239 |
| 2020/0394175 A1* | 12/2020 | Novotny ................ | G06F 16/27 |
| 2020/0394220 A1* | 12/2020 | Novotny ............. | G06F 16/9024 |
| 2021/0012336 A1* | 1/2021 | Zhuo ....................... | H04L 9/006 |
| 2021/0014066 A1* | 1/2021 | Zhuo .................... | H04L 9/3239 |

FOREIGN PATENT DOCUMENTS

| CN | 111866085 A | 10/2020 |
|---|---|---|
| WO | 2022001375 A1 | 1/2022 |

\* cited by examiner

*Primary Examiner* — Cam Linh T Nguyen

(57) ABSTRACT

The method includes: performing blockchain storage area allocation for transaction broadcast data; establishing a peer-to-peer transmission mechanism and a trust mechanism between nodes by the blockchain; acquiring network transaction broadcast data that needs to be subjected to blockchain storage; and recording, storing and managing the network transaction broadcast data; where the network transaction broadcast data is managed by dividing blockchain data into hot data and cold data; the hot data is stored in each of the blockchain nodes; and the cold data is divided into N parts to be correspondingly stored in N nodes of the blockchain nodes; and the hot data is data that needs to be frequently accessed by computing nodes, and the cold data is data that is infrequently accessed.

8 Claims, 3 Drawing Sheets

METHOD AND SYSTEM FOR REDUCING STORAGE OVERHEAD OF BLOCKCHAIN NODES, AND STORAGE MEDIUM

CROSS-REFERENCE TO RELATED APPLICATIONS

This application claims the benefit of priority from Chinese Patent Application No. 202210100075.1, filed on Jan. 27, 2022. The content of the aforementioned application, including any intervening amendments thereto, is incorporated herein by reference in its entirety.

TECHNICAL FIELD

This application relates to blockchain technology, and more particularly to a method and system for reducing storage overhead of blockchain nodes, and a storage medium.

BACKGROUND

Currently, some blockchain application scenarios may require storage of some large-size unstructured data, but the existing blockchain storage systems fails to store these data efficiently (while keeping all the stored data accessible by smart contracts). Since the traditional blockchain system does not seriously take the storage requirements into consideration at the design stage, its data model employs the simplest design that lacks memory hierarchy, in which all data is stored on the local hard disk by default, and the data can be read out with microsecond delay during operation. As a consequence, it not only fails to be compatible with the upper-level execution environment based on distributed storage, but also cannot achieve the data discrimination. Taking Bitcoin and Ethereum as examples, currently, the size of the single Bitcoin node has exceeded 350 G. (https://www.blockchain.com/charts/blocks-size), and the size of the full Ethereum node has exceeded 1 T. (https://eth.tokenview.com/cn/chart/dailyChainSize).

Referring to the growth trend of Bitcoin and Ethereum blocks shown in FIG. 1, the data stored in the full node rapidly increases over time and the continuous increase of blocks, and the amount of data stored in the nodes will continuously increases in the future, such that the storage overhead of the node will be exacerbated. Therefore, it is urgently needed to find a method for reducing the storage overhead of blockchain nodes.

SUMMARY

In view of the technical problem in the prior art that the continuously-increasing data size will exacerbate the storage overhead of nodes in the future, this application provides a method and system for reducing the storage overhead of blockchain nodes, and a storage medium, in which the blockchain data is divided into cold data and hot data, with hot data stored in each node and cold data stored in a distributed manner, so as to effectively reduce the storage overhead.

Technical solutions of this application are described as follows.

In a first aspect, this application provides a method for reducing storage overhead of blockchain nodes, comprising:
(S100) performing blockchain storage area allocation for transaction broadcast data;
(S200) establishing a peer-to-peer transmission mechanism and a trust mechanism between the blockchain nodes by a blockchain;
(S300) acquiring network transaction broadcast data that needs to be subjected to blockchain storage; and
(S400) recording, storing and managing the network transaction broadcast data; wherein the network transaction broadcast data is managed by dividing blockchain data into hot data and cold data; the hot data is stored in each of the blockchain nodes; and the cold data is divided into N parts to be correspondingly stored in N nodes of the blockchain nodes; and
the hot data is data that needs to be frequently accessed by computing nodes, and the cold data is data that is infrequently accessed.

Based on the above technical solutions, with respect to the method provided herein, the blockchain data is divided into hot data and cold data. The hot data is stored and maintained in each node, and the cold data is stored in a hierarchical and distributed manner. Taking 6 nodes as an example in the whole network, the cold data of the whole network is divided into 3 parts (N=3). Node 1 maintains ⅓ of the cold data, node 2 maintains ⅔ of the cold data, and node 3 maintains 3/3 of the cold data. When one of the nodes needs to find historical cold data, but fails to find it in the current node, it is feasible to request cold data from adjacent nodes, so as to request complete data. At the same time, in order to prevent some nodes from unexpectedly going down and failing to render services, distributed storage needs to consider the need for disaster recovery backup. Each piece of cold data in the whole system can have a plurality of copies or a plurality of backups based on an error correction code. As shown in FIG. 2, nodes 4/5/6 also store complete cold data in a distributed manner.

Compared with the existing storage methods, with respect to the method provided herein, the total storage capacity of cold data in the whole network is 2 copies which is reduced by ⅔ compared with the manner in which the whole-network data is stored in each node, effectively reducing the storage overhead and enabling the data integrity and reliability.

In an embodiment, the blockchain nodes each comprise hot storage and cold storage; the hot storage is configured to store the hot data; the cold storage is configured to store the cold data; the hot data stored in the hot storage is periodically migrated to the cold storage by using an algorithm, and when the cold data needs to be read, the cold data back is reloaded to the hot storage to realize cold-hot data dynamic conversion.

Based on the above technical solutions, the cold data and the hot data are converted and mutually accessed and updated, and the restriction on the data access efficiency due to the hierarchical storage of the cold data and the hot data is removed.

In an embodiment, for each cold data in a system, a plurality of copies or a plurality of backups based on an error correction code are set, such that when one of the N nodes loses its cold data, it is feasible to request access to adjacent nodes, and also to request access to the plurality of copies or backups; wherein the N is less than a total number of the blockchain nodes.

Based on the above technical solution, the whole network takes 6 nodes as an example, and the cold data of the whole network is divided into 3 parts (N=3), node 1 maintains ⅓ of the cold data, node 2 maintains ⅔ of the cold data, and node 3 maintains 3/3 of the cold data. When one of the nodes needs to find historical cold data, but fails to find it in the current node, the node is configured to request cold data from adjacent nodes, so as to request full data. Under the present disclosure, there are 2 copies of complete cold data storage under 6 nodes, which is smaller than the 6 copies stored by traditional blockchain nodes. Compared with the traditional blockchain node storage method, the method provided herein reduces the overhead and ensures the data integrity and data reliability.

In a second aspect, this application provides a system for reducing the storage overhead of blockchain nodes, comprising:

a blockchain; and a plurality of nodes on the blockchain;

wherein the blockchain is configured to establish a peer-to-peer transmission mechanism and a trust mechanism between the plurality of nodes;

the plurality of the nodes comprise a data acquisition module, a data management module and a report generation module;

the data acquisition module is configured to acquire network transaction broadcast data, and perform blockchain storage and accounting on the network transaction broadcast data;

the data management module is configured to divide blockchain data into hot data and cold data; wherein the hot data is stored in each of the plurality of nodes, and the cold data is divided into N parts to be correspondingly stored in N nodes of the plurality of nodes; and the report generation module is configured to form a visual report of data processed by the data management module according to storage memory.

Based on the above technical solutions, the system provided herein divides the blockchain data into hot data and cold data. The hot data is stored and maintained at each node, and the cold data is stored in a hierarchical and distributed manner. Taking 6 nodes as an example in the whole network, the cold data of the whole network is divided into 3 parts (N=3). Node 1 maintains ⅓ of the cold data, node 2 maintains ⅔ of the cold data, and node 3 maintains 3/3 of the cold data. When one of the nodes needs to find historical cold data, but fails to find it in the current node, it is feasible to request cold data from adjacent nodes, so as to request complete data. At the same time, in order to prevent some nodes from unexpectedly going down and failing to render services, distributed storage needs to consider the need for disaster recovery backup. Each piece of the cold data in the whole system can have a plurality of copies or a plurality of backups based on an error correction code. As shown in FIG. 2, nodes 4/5/6 also store complete cold data in a distributed manner.

In an embodiment, the data acquisition module is configured to acquire the network transaction broadcast data and implement its function through code.

In an embodiment, the data management module is configured to perform management through an algorithm.

In an embodiment, the report generation module is configured to perform report generation through an auxiliary management software.

In a third aspect, this application provides a storage medium for reducing the storage overhead of blockchain nodes, wherein a computer program is stored on the storage medium; and the computer program is configured to be executed by a processor to implement the method mentioned above.

Under the above-mentioned technical solutions, a computer program of the method for reducing storage overhead of blockchain nodes is stored on the storage medium. The computer program is configured to be executed by a processor of a computer.

Compared with the prior art, this application has the following beneficial effects. With respect to this disclosure, the blockchain data is divided into hot data and cold data. The hot data is stored and maintained at each node, and the cold data is stored in a hierarchical and distributed manner. Taking 6 nodes as an example in the whole network, the cold data of the whole network is divided into 3 parts (N=3). Node 1 maintains ⅓ of the cold data, node 2 maintains ⅔ of the cold data, and node 3 maintains 3/3 of the cold data. When one of the nodes needs to find historical cold data, but fails to find it in the current node, it is feasible to request cold data from adjacent nodes, so as to request complete data. At the same time, in order to prevent some nodes from unexpectedly going down and failing to render services, distributed storage needs to consider the need for disaster recovery backup. Each piece of the cold data in the whole system can have a plurality of copies or a plurality of backups based on an error correction code. As shown in FIG. 2, nodes 4/5/6 also store complete cold data in a distributed manner.

With respect to the blockchain data storage method provided herein, the total storage capacity of cold data in the whole network is 2 copies, which is reduced by ⅔ compared with the manner in which the whole-network data is stored in each node, effectively reducing the storage overhead.

DETAILED DESCRIPTION OF EMBODIMENTS

The disclosure will be described in detail below with reference to embodiments and the accompanying drawings, but is not limited thereto.

Embodiment 1

Figure 1:
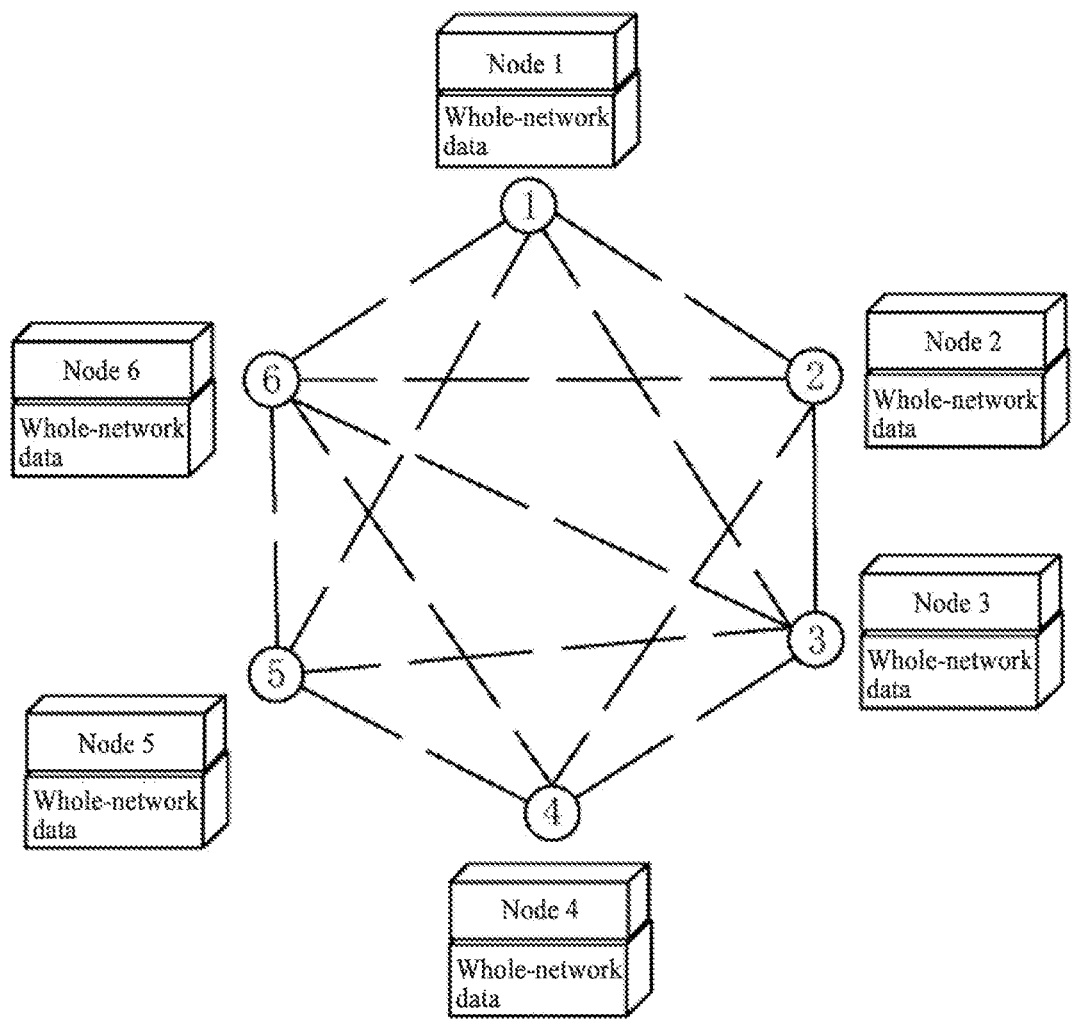
FIG. 1 is a reference diagram of the prior art.
Figure 2:
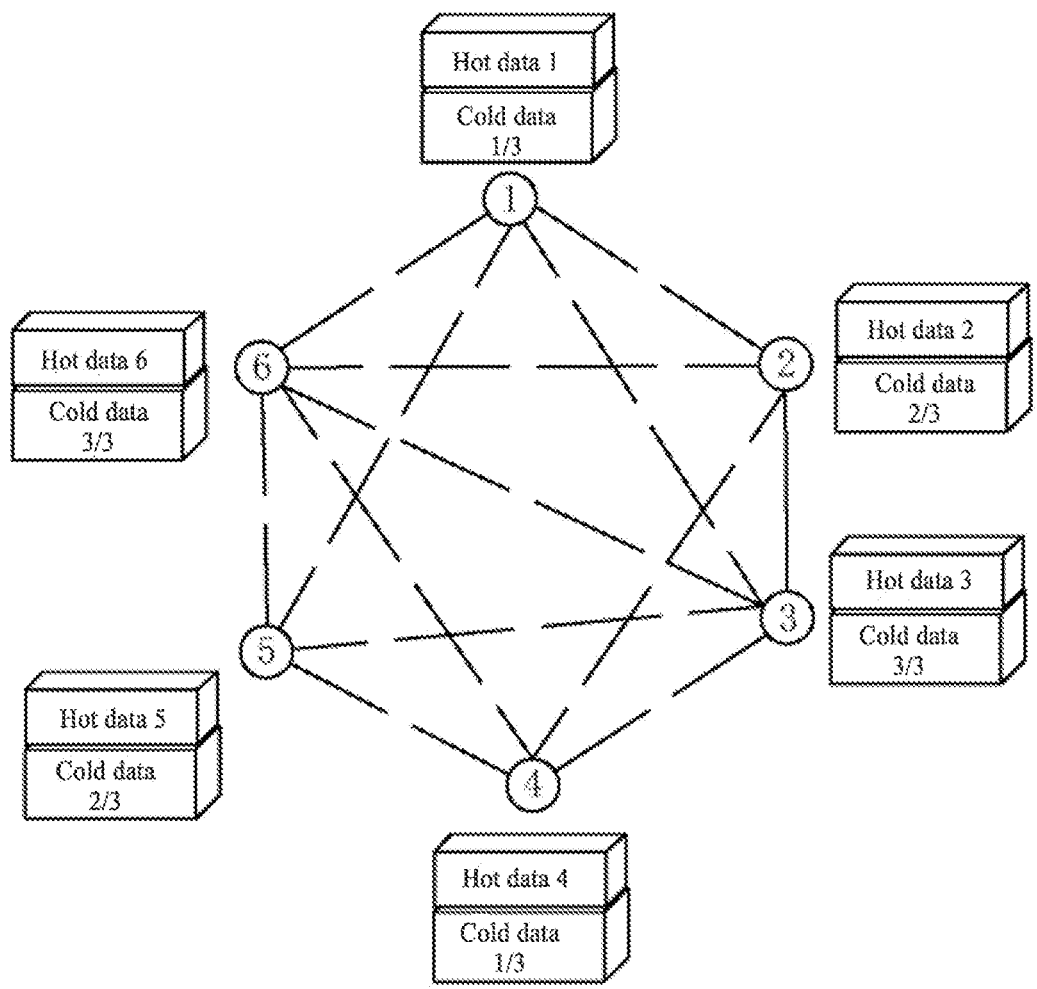
FIG. 2 schematically illustrates the design principle of hierarchical storage of blockchain data according to Embodiment 1.
Figure 3:
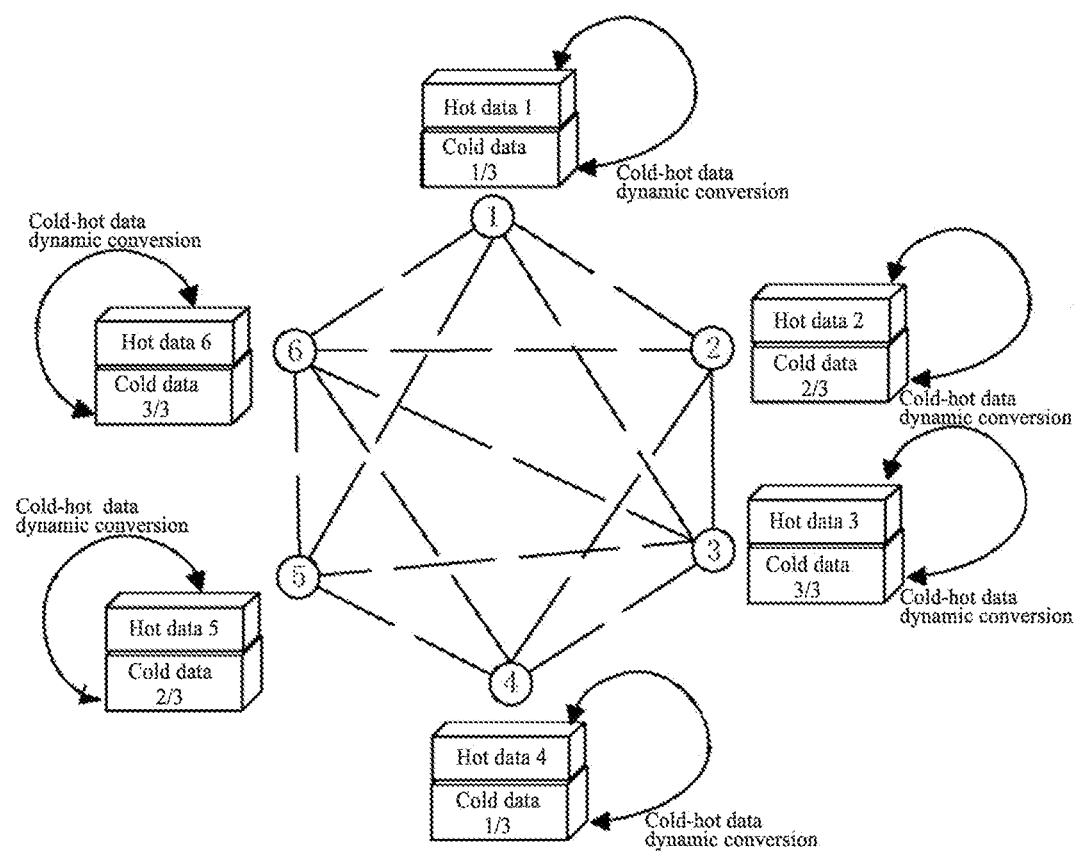
FIG. 3 schematically shows a principle of using the least recently used algorithm to periodically perform cold-hot data conversion according to the Embodiment 2.

Referring to FIGS. 2-3, a method for reducing the storage overhead of blockchain nodes is provided, which is performed through the following steps.

(S100) Blockchain storage area allocation is performed for transaction broadcast data.

(S200) A blockchain establishes a peer-to-peer transmission mechanism and a trust mechanism between the blockchain nodes.

(S300) Network transaction broadcast data that needs to be subjected to blockchain storage is acquired.

(S400) The network transaction broadcast data is recorded, stored and managed. The network transaction broadcast data is managed by dividing blockchain data into hot data and cold data. The hot data is stored in each of the plurality of nodes. The cold data is divided into N parts to be correspondingly stored in N nodes of the blockchain nodes. The hot data is data that needs to be frequently accessed by computing nodes, and the cold data is data that is infrequently accessed.

For each cold data in a system, a plurality of copies or a plurality of backups based on an error correction code are set, such that when one of the N nodes loses its cold data, it is feasible to request access to adjacent nodes, and also to request access to the plurality of copies or backups. The N is less than a total number of the blockchain nodes.

In order to realize the above-mentioned method, a system for reducing the storage overhead of blockchain nodes is designed, which includes a blockchain and a plurality of nodes on the blockchain. The blockchain is configured to establish a peer-to-peer transmission mechanism and a trust mechanism between the plurality of nodes. The plurality of nodes include a data acquisition module, a data management module and a report generation module.

The data acquisition module is configured to acquire network transaction broadcast data, and perform blockchain storage and accounting on the network transaction broadcast data.

The data management module is configured to divide blockchain data into hot data and cold data. The hot data is stored in each of the plurality of nodes. The cold data is divided into N parts to be correspondingly stored in the N nodes of the plurality of nodes.

The report generation module is configured to form a visual report of data processed by the data management module according to storage memory.

The data acquisition module is configured to acquire the network transaction broadcast data and implement its function through code. The data management module is configured to perform management through an algorithm. The report generation module is configured to perform report generation through an auxiliary management software.

The method provided herein is implemented by a computer program, which is required to be stored on a storage medium. A storage medium for reducing the storage overhead of blockchain nodes is also provided, on which a computer program configured to be executed by a processor to implement the method mentioned above is stored.

Embodiment 2

Referring to FIGS. 2-3, a method for reducing the storage overhead of blockchain nodes on a blockchain is provided, which is performed through the following steps.

(S100) Blockchain storage area allocation is performed for transaction broadcast data.

(S200) A blockchain establishes a peer-to-peer transmission mechanism and a trust mechanism between the blockchain nodes.

(S300) Network transaction broadcast data that needs to be subjected to blockchain storage is acquired.

(S400) The network transaction broadcast data is recorded, stored and managed. The network transaction broadcast data is managed by dividing blockchain data into hot data and cold data. The hot data is stored in each of the plurality of nodes. The cold data is divided into N parts to be correspondingly stored in N nodes of the blockchain nodes.

The hot data is data that needs to be frequently accessed by computing nodes, and the cold data is data that is infrequently accessed.

The blockchain nodes include hot storage and cold storage. The hot storage is configured to store the hot data. The cold storage is configured to store the cold data. The hot data stored in the hot storage is periodically migrated to the cold storage by using an algorithm, and when the cold data needs to be read, the cold data back is reloaded to the hot storage to realize cold-hot data dynamic conversion.

For each cold data in a system, a plurality of copies or a plurality of backups based on an error correction code are set, such that when one of the N nodes loses its cold data, it is feasible to request access to adjacent nodes, and also to request access to the plurality of copies or backups. The N is less than a total number of the blockchain nodes.

In order to realize the above-mentioned method, a system for reducing the storage overhead of blockchain nodes is provided, which includes a blockchain and a plurality of nodes on the blockchain. The blockchain is configured to establish a peer-to-peer transmission mechanism and a trust mechanism between the plurality of nodes. The plurality of nodes include a data acquisition module, a data management module and a report generation module.

The data acquisition module is configured to acquire network transaction broadcast data, and perform blockchain storage and accounting on the network transaction broadcast data.

The data management module is configured to divide blockchain data into hot data and cold data. The hot data is stored in each of the plurality of nodes, and the cold data is divided into N parts to be correspondingly stored in N nodes of the plurality of nodes.

The report generation module is configured to form a visual report of data processed by the data management module according to storage memory.

The data acquisition module is configured to acquire network broadcast data and implement its function through code. The data management module is configured to perform management through an algorithm. The report generation module is configured to perform report generation through an auxiliary management software.

In order to realize the method provided herein, the method provided herein is implemented by a computer program. A storage medium is required to store the computer program. A storage medium for reducing the storage overhead of blockchain nodes is provided, on which a computer program is stored. The computer program is configured to be executed by a processor to implement the method mentioned above.

Described above are merely preferred embodiments of this disclosure, which are not intended to limit this disclosure. It should be noted that various improvements and modifications made by those skilled in the art without departing from the spirit of the application should still fall within the scope of the present application defined by the appended claims.

What is claimed is:

1. A method for reducing storage overhead of blockchain nodes, comprising:
   (S100) performing blockchain storage area allocation for transaction broadcast data;
   (S200) establishing a peer-to-peer transmission mechanism and a trust mechanism between the blockchain nodes by a blockchain;
   (S300) acquiring network transaction broadcast data that needs to be subjected to blockchain storage; and
   (S400) recording, storing and managing the network transaction broadcast data; wherein the network transaction broadcast data is managed by dividing blockchain data into hot data and cold data; the hot data is stored in each of the blockchain nodes; and the cold data is divided into N parts to be correspondingly stored in N nodes of the blockchain nodes; and
   the hot data is data that needs to be frequently accessed by computing nodes, and the cold data is data that is infrequently accessed.

2. The method of claim 1, wherein the blockchain nodes each comprise hot storage and cold storage; the hot storage is configured to store the hot data; the cold storage is configured to store the cold data; the hot data stored in the hot storage is periodically migrated to the cold storage by using an algorithm, and when the cold data needs to be read, the cold data back is reloaded to the hot storage to realize cold-hot data dynamic conversion.

3. The method of claim 1, wherein for each cold data in a system, a plurality of copies or a plurality of backups based on an error correction code are set, such that when one of the N nodes loses its cold data, it is feasible to request access to adjacent nodes, and also to request access to the plurality of copies or backups; wherein the N is less than a total number of the blockchain nodes.

4. A system for reducing storage overhead of blockchain nodes, comprising:

a blockchain; and a plurality of nodes on the blockchain;

wherein the blockchain is configured to establish a peer-to-peer transmission mechanism and a trust mechanism between the plurality of nodes;

the plurality of the nodes comprise a data acquisition module, a data management module and a report generation module;

the data acquisition module is configured to acquire network transaction broadcast data, and perform blockchain storage and accounting on the network transaction broadcast data;

the data management module is configured to divide blockchain data into hot data and cold data; wherein the hot data is stored in each of the plurality of nodes, and the cold data is divided into N parts to be correspondingly stored in N nodes of the plurality of nodes; and the report generation module is configured to form a visual report of data processed by the data management module according to storage memory.

5. The system of claim 4, wherein the data acquisition module is configured to acquire the network transaction broadcast data and implement its function through code.

6. The system of claim 4, wherein the data management module is configured to perform management through an algorithm.

7. The system of claim 4, wherein the report generation module is configured to perform report generation through an auxiliary management software.

8. A storage medium for reducing storage overhead of blockchain nodes, wherein a computer program is stored on the storage medium; and the computer program is configured to be executed by a processor to implement the method of claim 1.

* * * * *